Aug. 5, 1941.　　　J. W. SAILLER　　　2,251,424
TIRE CHAIN
Filed Feb. 23, 1939
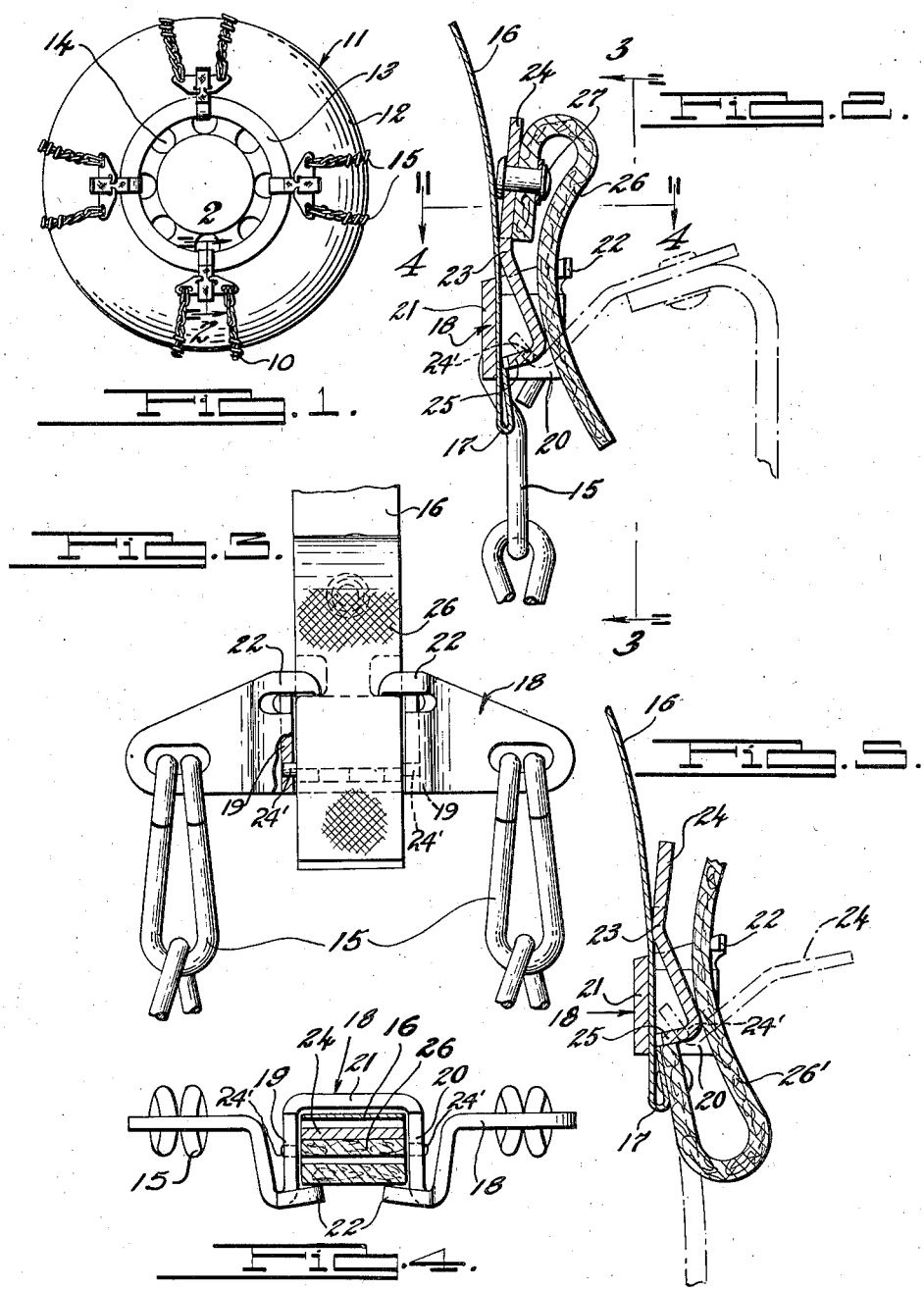
INVENTOR
John W. Sailler
BY
ATTORNEYS.

Patented Aug. 5, 1941

2,251,424

UNITED STATES PATENT OFFICE 2,251,424

TIRE CHAIN

John W. Sailler, Pleasant Ridge, Mich.; assignor to Chrysler Corporation, Highland Park, Mich., a corporation of Delaware Application February 23, 1939, Serial No. 257,876

7 Claims. (Cl. 152—237)

This invention relates to an anti-skid device and more particularly to a device of this character which is adapted to be applied to a road wheel of a motor vehicle.

A device of this character includes a chain forming the ground contact and an attaching strap fixed to one end of the chain and adapted to be passed between wheel spokes or through openings in the wheel for attachment to the other end of the chain. Generally, devices of this type are applied to the wheel at circumferentially spaced locations with the attaching strap engaging the rim surface of the wheel. This strap is subjected to relatively sudden and severe applications of force as the chain intermittently engages the ground surface due to rapid rotation of the wheel. As a result of these forces considerable strain is opposed on the attaching strap and as a consequence thereof there is a tendency of the latter to break after a relatively short period of use.

An object of the invention, therefore, is to provide a device of this character in which the ordinary weak portions possess such strength that the device will not break at these latter portions. In carrying out the foregoing, the attaching strap for the device is preferably formed from sheet metal of a suitable gauge to provide the requisite strength for resisting the relatively sudden and severe forces acting thereon without materially increasing the size or the weight of the device. This strap is preformed with a permanent body having a contour of the wheel rim. This arrangement facilitates application of the device to a road wheel, inasmuch as the metallic strap can be passed between spokes or through openings and moved to an attaching position with greater ease than would be experienced with a strap of flexible fabric material, for instance.

Devices of the type herein contemplated generally include a buckle or another suitable member permanently secured to an end portion of a chain and engageable with the normally free end of the attaching strap when the device is attached to the ground wheel. Another object of the invention is to provide means for connecting the normally free end of the attaching strap with the buckle and for this purpose the strap is provided, preferably adjacent the free end thereof, with an abutment which cooperates with suitable means such as a clasp for retaining the device on a road wheel.

Another object of the invention is to provide improved means for preventing unintended disengagement of the strap and buckle and for this purpose there is provided a relatively inexpensive strap of material, preferably fabric, and having a degree of flexibility that permits it to be readily bent or folded upon itself.

Other objects and advantages of the invention will be more apparent from the following description of my invention, reference being had to the accompanying drawing in which:

Fig. 1 is a side elevational view of a vehicle road wheel having the improved anti-skid device applied thereto.

Fig. 2 is a vertical sectional view of the antiskid device, the view being taken as indicated by line 2—2 of Fig. 1.

Fig. 3 is a fragmentary side elevational view taken as indicated by the line 3—3 of Fig. 2.

Fig. 4 is a horizontal sectional view taken as indicated by the line 4—4 of Fig. 2.

Fig. 5 is a view similar to Fig. 2 but illustrating a modified form of the invention.

The improved anti-skid device generally indicated at 10 is illustrated and described in connection with a vehicle ground wheel support including a pneumatic casing 12 and a rim portion 13. The wheel 11 is of the type having openings 14 adjacent the rim. The device 10 includes a chain portion 15 having one end thereof permanently connected with an end portion of an attaching strap 16, the latter being preferably formed of sheet metal and being permanently bowed intermediate the ends thereof to a contour substantially conforming to the contour of the adjacent portion of the road wheel. The opposite or normally free end of the strap 16 is provided with an abutment 17, formed as illustrated by folding or bending the material into overlapping relation. It will be understood, of course, that the abutment 17 can be otherwise provided and that the invention in its broader aspects is not to be limited by the particular illustration.

When the anti-skid device 10 is applied to a road wheel, the normally free end of a strap 16 is connected with a chain 15 by a buckle 18 preferably permanently secured to the chain as shown in Fig. 3. The buckle 18 is formed to provide a channel having oppositely disposed side walls 19 and 20 which are interconnected by a right angularly extending wall 21. Extending inwardly of the channel and in spaced relation to the wall 21 are a pair of flanges 22, the latter as well as the channel being shown more particularly in Fig. 4.

A clasp 23 is positioned in the channel of the buckle 18 and is pivotally mounted therein by a pintle 24 extending through openings in the side walls 19 and 20. The clasp is preferably metallic and includes a relatively long arm 24 and a relatively short angularly disposed flange 25. This clasp is adapted to be swung to a position to accommodate insertion of the free end portion of the strap 16 into the channel and intermediate the wall 21 and flanges 22 and 25, as shown in Fig. 2, with the abutment 17 extending beyond the channel. When the parts are thus arranged, the clasp 23 is swung to a position so that the flange 25 thereof engages the abutment 17 of the attaching strap 16 to prevent withdrawal of the latter from the channel.

In order to prevent unintended movement of the clasp 23 from the position shown in Fig. 2, a strap 26, preferably formed of an inexpensive fabric or other material, is adapted to be inserted in the channel of the buckle between the flanges 22 thereof and the arm 24 of the clasp. In this manner the flange 25 is maintained in its position of engagement with the abutment 17. The strap 26 is sufficiently flexible so that it can be readily folded for insertion in the position illustrated in Fig. 2. A rivet 27 secures the strap 26 to the arm 24 of the clasp 23.

In the form of the invention illustrated in Fig. 5, the parts are constructed and arranged in the manner heretofore set forth except that the strip 26' is secured to the attaching strap 16, and when the device is applied to a road wheel the strip 26' is inserted through the channel of the buckle and then folded for insertion between the arm 24 and the flanges 22.

An anti-skid device constructed according to the present invention possesses relatively great strength by reason of the metallic strap 16 and will successfully resist the sudden and severe applications of force which are applied thereto through intermittent engagement of the device with the ground or other surface. Application of the device to a wheel is facilitated due to the fact that the strap 16 possesses a degree of rigidity which makes it more tractable than a fabric strap and this is of great advantage when it is considered that in practically all instances the device is applied to a wheel assembled with respect to its vehicle. In making the application the operator must pass the strap through the wheel opening from the side of the latter opposite that at which the strap is to be attached to the buckle. In addition to this desired strength and facility the construction makes possible the use of a relatively inexpensive retaining strap as indicated at 26.

When the parts are in the positions illustrated herein, it is not necessary that the flange 25 engage the metal of the strap 16 in resisting the forces which tend to withdraw the strap from the channel. These forces are resisted by an engagement of the flange 25 of the clasp with the abutment 17 and in this manner the useful life of the device is further prolonged.

Although but several specific embodiments of the invention are herein shown and described, it will be understood that various changes in the size, shape and arrangement of parts may be made without departing from the spirit of my invention.

What I claim is:

1. In an anti-skid device for a ground wheel, a chain, a buckle member connected with one end of said chain, said buckle member including a channel portion having side and bottom walls and a portion extending inwardly with respect to said channel portion in spaced relation to the bottom wall thereof, a sheet metal attaching strap member connected with the other end of said chain and having a normally free end adapted to extend into said channel when said device is applied to a ground wheel, said strap member having an abutment adjacent said normally free end, a clasp member pivotally mounted in said channel portion and engageable with said abutment, and a non-metallic strip carried by one of said members and having a normally free end portion extending between said inwardly extending buckle portion and said clasp portion positioning the latter to engage said abutment.

2. In an anti-skid device for a vehicle ground wheel having a rim, a chain, a sheet metal strap member connected with one end of said chain and having a permanently bowed portion conforming substantially to the contour of and engageable with an exposed surface of said rim, said strap member having an abutment adjacent the normally free end thereof, a buckle member connected with the other end of said chain for connecting the latter with the normally free end of said strap member when said device is applied to a ground wheel, a clasp member carried by said buckle member and engageable with said abutment, and a relatively flexible strip carried by one of said members and insertable between portions of said buckle member and said strap member for positioning said clasp member to engage said abutment.

3. In an anti-skid device, a chain, a buckle connected with one end of said chain, a metallic strap connected with the other end of said chain, said strap having an integrally formed abutment, a clasp carried by said buckle and engageable with said abutment, and a non-metallic strap for retaining said clasp in engagement with said metallic strap.

4. In an anti-skid device, a chain, a metallic strap connected with one end of said chain, a buckle connected with the other end of said chain, said buckle having a channel-like portion for receiving the normally free end of said strap, a clasp having angularly disposed portions pivotally mounted in said channel-like portion, one of said angularly disposed portions being engageable with said strap adjacent the said normally free end thereof for retaining the latter in said channel-like portion, and a flexible non-metallic strap secured to one of the angularly disposed portions of said clasp and insertable into said channel for retaining the other of said angularly disposed clasp portions in engagement with said metallic strap, said metallic strap having an abutment adjacent the free end thereof engageable with the last mentioned angularly disposed portion of said clasp.

5. In an anti-skid device, a chain, a metallic strap having an end portion thereof connected with an end portion of said chain, a buckle connected with the other end portion of said chain and having a channel-like portion receiving the normally free end portion of said strap, a clasp mounted on said channel-like portion and engageable with said strap for retaining the latter against detachment from said buckle, and a flexible non-metallic strap extending into said channel-like portion and engageable with said clasp for retaining the latter in engaging position with respect to said metallic strap.

6. In an anti-skid device, a chain, a metallic strap having an end portion thereof connected with an end portion of said chain, a buckle connected with the other end portion of said chain and having a channel-like portion receiving the normally free end portion of said strap, a clasp mounted on said channel-like portion and engageable with said strap for retaining the latter against detachment from said buckle, and a flexible non-metallic strap extending into said channel-like portion and engageable with said clasp for retaining the latter in engaging position with respect to said metallic strap, said non-metallic strap being carried by said metallic strap.

7. In an anti-skid device, a chain, a metallic strap having an end portion thereof connected with an end portion of said chain, a buckle connected with the other end portion of said chain and having a channel-like portion receiving the normally free end portion of said strap, a clasp mounted on said channel-like portion and engageable with said strap for retaining the latter against detachment from said buckle, and a flexible non-metallic strap extending into said channel-like portion and engageable with said clasp for retaining the latter in engaging position with respect to said metallic strap, said non-metallic strap being carried by said clasp.

JOHN W. SAILLER.